US006779294B2

(12) United States Patent
Ames (10) Patent No.: US 6,779,294 B2
(45) Date of Patent: Aug. 24, 2004

(54) BREAKABLE LINK (76) Inventor: Robert Ames, 10A Gordon Dr., Rockland, ME (US) 04841

( * ) Notice: Subject to any disclaimer, the term of this patent is extended or adjusted under 35 U.S.C. 154(b) by 0 days.

(21) Appl. No.: 10/435,474

(22) Filed: May 12, 2003

(65) Prior Publication Data
US 2003/0192228 A1 Oct. 16, 2003

Related U.S. Application Data (63) Continuation of application No. 10/042,378, filed on Jan. 11, 2002, now Pat. No. 6,564,500.

(51) Int. Cl.$^7$ .......................... A01K 91/00; F16G 11/00
(52) U.S. Cl. .......................................... 43/43.12; 59/85
(58) Field of Search ...................... 43/43.12; 59/78–95; 241/291; 24/115 F; 403/2

(56) References Cited

U.S. PATENT DOCUMENTS

| | | |
|---|---|---|
| 2,421,789 A | 6/1947 | Ingham |
| 2,768,468 A | 10/1956 | Kibler et al. |
| 3,426,472 A | 2/1969 | Richard |
| 3,541,720 A | 11/1970 | Buffet et al. |
| 3,656,797 A | 4/1972 | Ratcliff |
| 3,724,120 A | 4/1973 | Richard |
| 3,744,177 A | 7/1973 | Cron, Jr. |
| 3,817,218 A | 6/1974 | Bongiovanni |
| 3,892,083 A | 7/1975 | Peterson |
| 3,925,921 A | 12/1975 | Tucker et al. |
| 3,944,023 A | 3/1976 | Fisher |
| 3,995,598 A | 12/1976 | Gardner et al. |
| 4,080,782 A | 3/1978 | Colecchio |
| 4,125,958 A | 11/1978 | Cote |
| D257,506 S | 11/1980 | Plante |
| D257,628 S | 12/1980 | Plante |
| 4,249,277 A | 2/1981 | Plante |
| 4,262,379 A | 4/1981 | Jankiewicz |
| 4,330,926 A | 5/1982 | Mc Call |
| 4,445,295 A | 5/1984 | Litrico |
| 4,491,091 A | 1/1985 | Satterfield |
| 4,517,913 A | 5/1985 | Albertini et al. |
| 4,753,030 A | 6/1988 | Ziglinski |
| 4,774,742 A | 10/1988 | Johnson |
| 4,864,696 A | 9/1989 | Mittermaier et al. |
| 4,987,639 A | 1/1991 | Baiuley et al. |
| 5,076,006 A | 12/1991 | Kahng |
| 5,088,228 A | 2/1992 | Waldie, Jr |
| 5,122,007 A | 6/1992 | Smith |
| 5,195,217 A | 3/1993 | Arntzen |
| 5,372,532 A | 12/1994 | Robertson, Jr. |
| 5,466,082 A | 11/1995 | Sherar |
| 5,519,961 A | 5/1996 | Lauritzen et al. |
| 5,599,129 A | 2/1997 | Clifton et al. |
| 5,913,670 A | 6/1999 | Anderson et al. |
| 5,987,710 A | 11/1999 | Paul et al. |
| 6,457,896 B1 | 10/2002 | DeDoes |
| 6,564,500 B1 * | 5/2003 | Ames ........................ 43/43.12 |

* cited by examiner

Primary Examiner—Charles T. Jordan
Assistant Examiner—Bret Hayes
(74) Attorney, Agent, or Firm—Lowe Hauptman; Gilman & Berner LLP (57) ABSTRACT A method of establishing a fishing line comprises the steps of attaching attachment openings of a breakable link to a surface buoy and underwater gear, and disconnecting the surface buoy from the underwater gear by irrecoverably breaking the wall of one of the attachment openings at a weakened portion thereof, without breaking a join portion connecting the attachment openings. The weakened portion extends circumferentially from 150° to 210°, i.e. for about a half of an entire circumference of the associated attachment opening. The thickness and/or material failure load of the weakened portion is from 50 to 70% of the thickness and/or material failure load of the remaining elements of the breakable link. The connecting portions may be rigidly integrated with each other, or pivotably attached via the join portion.

5 Claims, 6 Drawing Sheets

BREAKABLE LINK

This application is a continuation of application Ser. No. 10/042,378, filed Jan. 11, 2002, now U.S. Pat. No. 6,564,500.

TECHNICAL FIELD

The present invention generally relates to a breakable link for use in a fishing line which breaks upon application of a load in excess of a terminal material failure of the breakable link. More particularly, the present invention relates to a breakable link configured to reliably break when a large animal such as a cetacean is entangled in the fishing line equipped with the breakable link, thereby releasing the animal without harm or death, or only with minimal injury.

BACKGROUND OF THE INVENTION

It has been known in the fishing industry that whales and other cetaceans may be entangled in various underwater obstructions, such as fixed fishing gear, crab traps, sink gillnets, lobster trawls, and the like. More particularly, these animals may become entangled with buoy lines connecting a surface buoy at the water surface level to underwater gear located at the sea bottom. If the entanglement happens, the animal is likely to attempt to tow the surface buoy, buoy line and the underwater gear associated with the surface buoy. The heavy weight of the underwater gear, as well as the drag resistance from movement of the gear through the water, limits the ability of the animal to maneuver and/or resurface for air. The size and strength of the animal lets it continue for a limited time but under great strain and stress. In some cases, the animal may be severely injured and/or stressed which can lead to death of the animal.

Certain federal legislation, such as NMFS, has been passed to impose strict standards on the fishing industry to protect marine mammals from death or injury caused by entanglement with underwater fishing lines. A solution has been proposed to timely disconnect the underwater gear from the surface buoy, thereby releasing the entangled whale/cetacean from the buoy line attaching the two devices. In order to carry out this method, there is still a need for a device which, when incorporated in a fishing line, will reliably break to separate the buoy from the gear and free the entangled animal.

SUMMARY OF THE INVENTION

It is, therefore, an object of the present invention to provide a light weighted and inexpensive breakable link which, in practice, reliably breaks upon application of an appropriate load regardless of how, e.g., under what angle the load is applied to the breakable link.

It is another object of the present invention to provide a breakable link which can be used with a wide variety of rope or cable of different sizes without significantly affecting the breakable link's capability of releasing an entangled cetacean from a underwater fishing line utilizing the breakable link.

It is a further object of the present invention to provide a breakable link configuration which facilitates calibration of the breakable link to various load requirements without having to scale up or down the whole device, thereby simplifying the manufacturing process.

These and other objects of the present invention are achieved by a method of establishing a fishing line, comprising the steps of a) providing a breakable link having two distinct attachment openings having walls joined to each other by a join portion; b) attaching the attachment openings to a surface buoy and underwater gear, respectively, using e.g. rope; and c) disconnecting the surface buoy from the underwater gear by irrecoverably breaking the wall of one of the attachment openings at a weakened portion thereof without breaking the join portion. In accordance with the present invention, it is desirable that at least one of the ropes used to attach the breakable link to the surface buoy and underwater gear is released without any portions of the breakable link staying on the rope.

In accordance with an aspect of the present invention, a break-away connector is provided for use in the method of the invention. The break-away connector comprises, along a longitudinal axis thereof, two connecting portions for connection with external devices, and a join portion joining the connecting portions together. One of the connecting portions is formed as a loop shaped body extending continuously circumferentially for 360°. The body comprises a first portion joined to the join portion, and a second weakened portion extending for about a half of an entire circumference of the body and having a material failure load smaller than those of the first portion, the other connecting portion and the join portion. Upon administration to the weakened portion of a load higher than the material failure load thereof, the body irrecoverably breaks at the weakened portion to disconnect the external devices.

In a preferred embodiment, the thickness and/or material failure load of the weakened portion is from about 50 to about 70% of the thickness and/or material failure load of the first portion, the other connecting portions and the join portion. For certain types of underwater gear, such as lobster trap, the material failure load of the weakened portion is preferably from about 500 to about 600 lbs. For other types of underwater gear and/or application, other strengths may be needed. The material failure load of the weakened portion is preferably in a range of from about 100 to about 3780 lbs.

In accordance with another aspect of the present invention, a fishing line is provided for implementing the method of the present invention. The fishing line comprises underwater gear, a surface buoy connected to the underwater gear via a buoy line, and at least a breakable link incorporated in the buoy line. The breakable link comprises, along a longitudinal axis thereof, two connecting portions for connection with external devices, and a join portion joining the connecting portions together. One of the connecting portions are formed as an annulus having a circular cross-section and extending continuously circumferentially for 360°. The annulus comprises a first portion joined to the join portion, and a second weakened portion having a cross-sectional diameter, and hence area, smaller than that of the first portion. Upon administration to the weakened portion of a load higher than a material failure load thereof, the annulus irrecoverably breaks at the weakened portion to disconnect the buoy from the underwater gear.

In a preferred embodiment, the cross-sectional diameter or area of the weakened portion is from about 50 to about 60% of the cross-sectional diameter or area of the first portion to ensure reliable break of the weakened portion. Preferably, the weakened portion extends circumferentially for from about 150° to about 210°.

The connecting portions may be integrated with the join portion into a single body. Alternatively, the connecting portions are separately formed and pivotably attached via the join portion so that the connecting portions are rotatable with respect to each other about the longitudinal axis of the break-away connector while remaining inseparable along the longitudinal axis.

BRIEF DESCRIPTION OF THE DRAWINGS

The present invention is illustrated by way of example, and not by limitation, in the figures of the accompanying drawings, wherein elements having the same reference numeral designations represent like elements throughout, and wherein.

BEST MODE FOR CARRYING OUT THE INVENTION

A breakable link and a fishing line incorporating the breakable link in accordance with the present invention are described. In the following detailed description, for purposes of explanation, numerous specific details are set forth in order to provide a thorough understanding of the present invention. It will be apparent, however, that the present invention may be practiced without these specific details. In other instances, well-known structures and devices are schematically shown in order to simplify the drawing.

Figure 1:
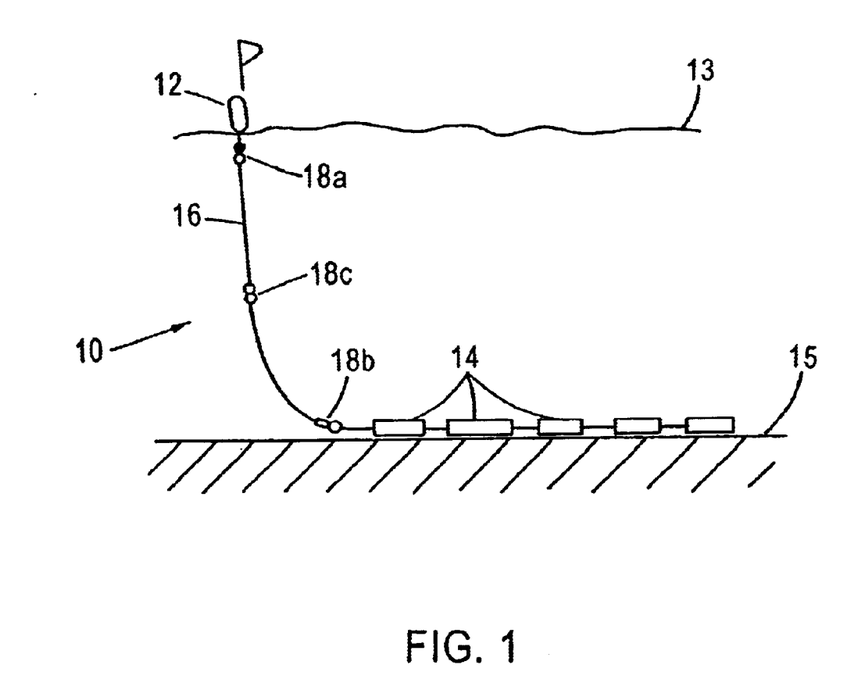
FIG. 1 is a diagram showing a fishing line incorporating a breakable link of the invention.

Referring now to FIG. 1, a fishing line 10 is shown. The fishing line 10 comprises a surface buoy 12, underwater gear 14 and a buoy line 16 connecting the surface buoy 12 with the underwater gear 14. The underwater gear 14 may comprise one or more gillnets, lobster trawls, quahog traps, clam, crab and oyster traps or sleds, fishing weirs, and long line fishery equipment. However, the underwater gear 14 is not limited to fishing gear, but can also include any submerged equipment, device or system where entanglement by marine mammals is a potential problem. The underwater gear 14 may include water column obstructions as well. The surface buoy 12 may include any floating device used to indicate the location of the underwater gear 14. The surface buoy 12 is connected to the underwater gear 14 via the buoy line 16 which comprises a rope, cable, etc. made of natural or synthetic material such as nylon, polyester, polypropylene, or other plastic or suitable material known in the art. In addition, the rope or cable 16 is attached to the surface buoy 12 and/or underwater gear 14 by any means known in the art. As illustrated in FIG. 1, the surface buoy 12 floats at the water surface level 13 while the underwater gear 14 is positioned e.g. on the sea bed 15.

The fishing line 10 further comprises at least one breakable link in accordance with the present invention. As can be seen in FIG. 1, the fishing line 10 may include one or more breakable links at any locations along the fishing line 10. For example, a breakable link in one embodiment of the present invention can be placed in the buoy line 16 at a location 18a in the water column near the surface buoy 12. Additionally or alternatively, a breakable link can be placed at a location 18b in the buoy line 16 near the underwater gear 14 on the sea bed 15. Additionally or alternatively, a breakable link can be placed at a location 18c in the middle of the buoy line 16 between the surface buoy 12 and underwater gear 14.

In the fishing line 10, a load or stress is created in the buoy line 16, when e.g. a whale becomes entangled in the buoy line 16 or underwater gear 14 and attempts to leave and/or release itself. If the load or stress is applied to a weakened portion of the breakable links 18a, 18b, 18c which is designed to fail at a specific load smaller than the load or stress caused by the whale, the weakened portion of the breakable link will rupture to disconnect the surface buoy 12 from the underwater gear 14 thereby releasing the whale. It has been noted that due to many factors such as the depth of the sea where the underwater gear 14 is placed, the length of the buoy line 16, the location of the breakable link or links in the buoy line 16, the location in the fishing line 10 where the whale is entangled, and external influence of wave and wind etc., the load or stress caused by the whale's movement may occur to various portions of the breakable links and at various angles. It is therefore important to configure the breakable link so that, in most cases, the stress caused by the whale's movement will always be applied to the weakened portion, thereby ensuring reliable rupture of the breakable link.

Figure 2:
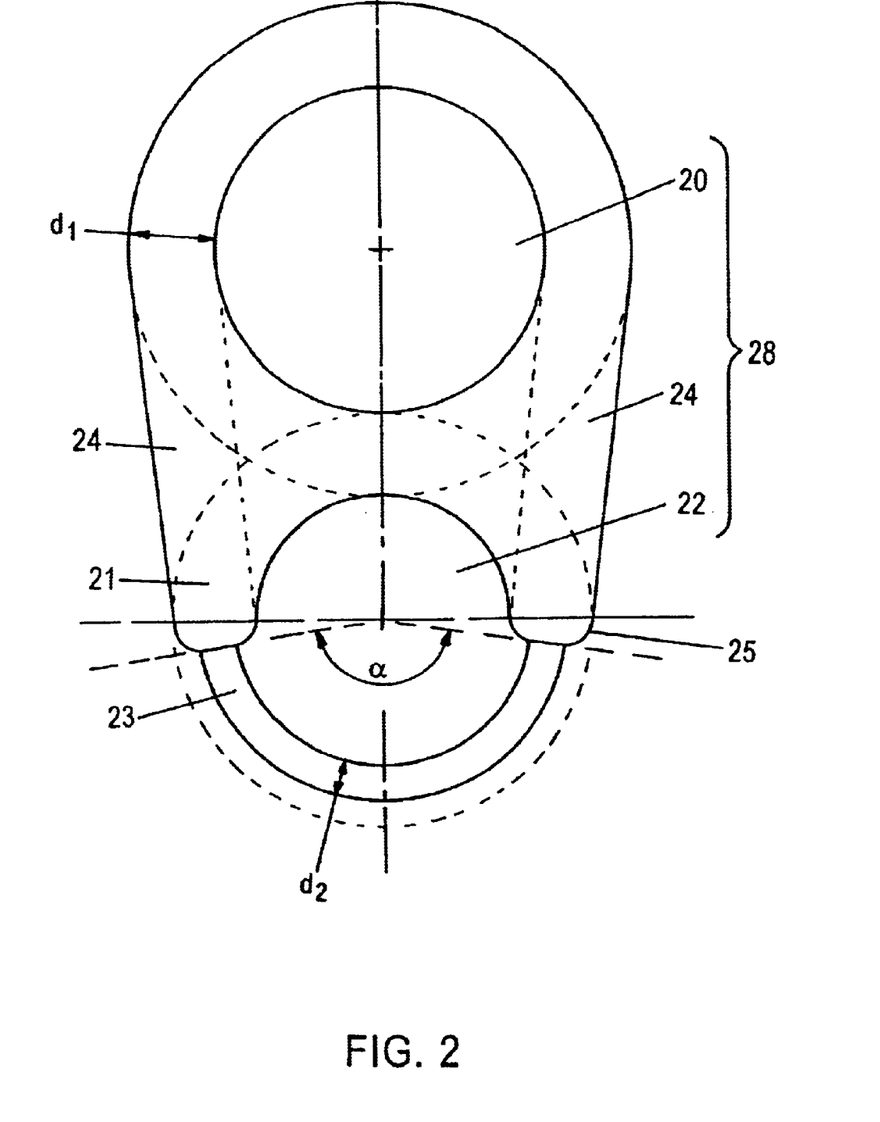
FIG. 2 is a front view of a breakable link in accordance with an embodiment of the present invention.

Such a configuration of the breakable link is shown in FIG. 2 which is a front view of a breakable link 28 in accordance with an embodiment of the present invention. The breakable link 28 comprises two loop-shaped connecting portions 20, 22 and a join portion 24 connecting the loop-shaped connecting portions 20, 22. In use, the breakable link 28 may be incorporated into the buoy line 16 depicted in FIG. 1 so that each connecting portions 20, 22 is attached to one of the surface buoy 12 and underwater gear 14 via a length of rope or cable. In one embodiment, the connecting portion 20 or 22 may be attached to a loop formed at one end of the rope of cable. The other end of the rope or cable is attached to the surface buoy 12 or underwater gear 14 in a known manner. However, other arrangements are not excluded.

In accordance with an aspect the present invention, one of the connecting portions, i.e. connecting portion 22 comprises a full-size portion 21 joined to the join portion 24 and a reduced-size or weakened portion 23. The term "reduced-size" means the weakened portion 23 has at least one cross-sectional dimension smaller than that of the full-size portion 21, and preferably, the connecting portion 20 and the join portion 24. The cross-sectional dimension may be the width of the full-size portion 21 and weakened portion 23, as seen in the front view depicted in FIG. 2. As can be seen in FIG. 2, the walls of the full-size portion 21, the connecting portion 20 and the join portion 24 are wider than the wall of the weakened portion 23. Accordingly, the weakened portion 23 is expected to be the weakest point of the breakable link 28 which will rupture first when an appropriate load or stress is applied thereto. Additionally or alternatively, the cross-sectional dimension may be the thickness of the full-size portion 21 and weakened portion 23, as seen in a side elevational view of the breakable link demonstrated in FIG. 5. In a preferred embodiment when the connecting portion 20, full-size portion 21 and weakened portion 23 are formed as annuluses having circular cross-sections, the cross-sectional dimension is the respective cross-sectional diameters, d1 and d2, of the connecting, portion 20 or full-size portion 21 and weakened portion 23. In this embodiment, it is preferable to have the connecting portion 20, join portion 24 and full-size portion 21 of the same thickness or cross-sectional diameter.

However, the weakened portion 23 needs not necessarily have a reduced thickness or dimension with respect to other elements of the breakable link 28. The weakened portion 23 may have a thickness or dimension equal to or even greater than those of the remaining elements of the breakable link 28, while remaining the weakest point in the breakable link. It is sufficient to configure the weakened portion 23 to have a material failure load smaller than those of the remaining elements, i.e. the full-size portion 21, the connecting portion 20 and the join portion 24. This can be done by selecting different materials, or configurations as illustrated in FIG. 2, or both, for the weakened portion 23 and the remaining elements of the breakable link. The term "material failure load" is understood as the magnitude of tensile load applied to the material which is sufficient to cause failure or rupture of the material at the point of load application.

Figure 3:
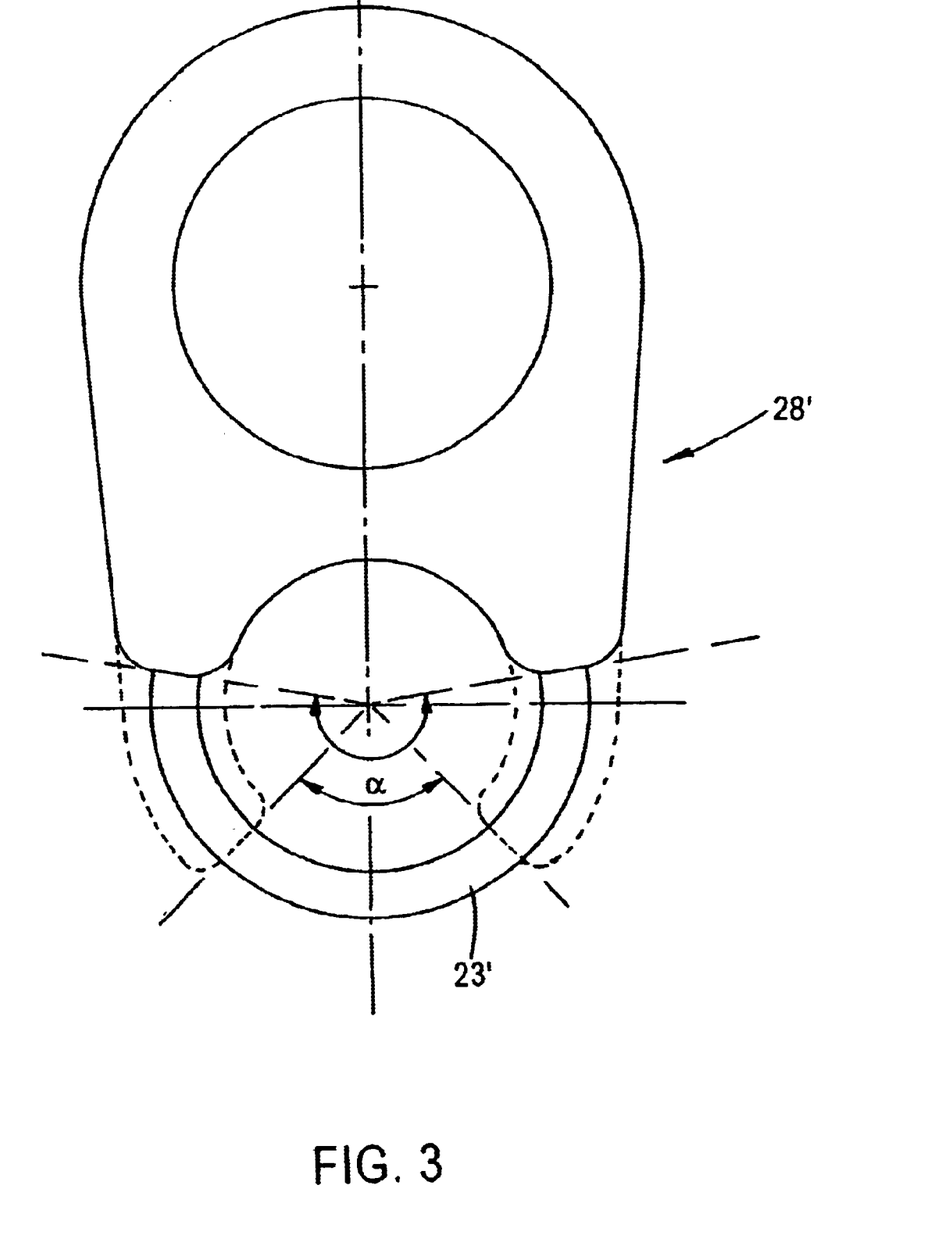
FIG. 3 is a front view of a breakable link in accordance with another embodiment of the present invention.

In accordance with another aspect of the present invention, the weakened portion 23 extends for about a half of the entire circumference of the loop-shaped connecting portion 22. In the embodiment of FIG. 2, the weakened portion 23 extends circumferentially for about 90° on either side of a longitudinal axis (not shown) of the breakable link, for a total of about 180°. Such elongated geometry of the weakened portion 23 ensures that, in most cases, the load or stress applied to the connecting portion 22 from a rope or cable (not shown) will be applied to the weakened portion 23, and not to other thick portions such as the full-size portion 21. As a result, the breakable link 28 will reliably break to release the whale or cetacean entangled in the fishing line 10. It has been found that it is preferable to have the weakened portion extending for from about 150°, as shown at 23 in FIG. 2, to about 210°, as shown at 23' in FIG. 3. Since the load or stress may occur at various angles on either side of the breakable link, it is preferable to configure the weakened portion 23 and the breakable link 28 symmetrical with respect to the longitudinal axis of the breakable link 28.

The elongated geometry of the weakened portion 23 also facilitates calibration of the breakable link 28 to meet actual needs in the field. As has been noted above, the load or stress applied by a struggling whale to the buoy line 16 in which it is entangled can vary depending, among other things, on the size and strength of the whale, and the number of whales entangled. These factors, in turn, depend on the species and number of whales in a particular ocean area. Thus, in some regions it may be desirable to used breakable links having one material failure load, while in other regions breakable links of a different material failure load may be adequate. To manufacture breakable links with various material failure loads, it may not be necessary to scale up or down the whole breakable link. It may be sufficient to just slightly change the cross-sectional diameter, and hence area, or thickness of the weakened portion 23 to meet new requirements. In a working example, a 500 lb breakable link (shown in FIG. 2) and a 600 lb breakable link of the present invention have almost identical 'thick" elements including the connecting portion 20, join portion 24 and full-size portion 21. The "thick" elements have a substantially uniform cross-sectional diameter of about 10 mm and a material failure load of about 1000 lbs. The weakened portions of the two breakable links are, however, slightly different with cross-sectional diameters of about 5 and 6 mm, respectively. Thus, a small change in the thickness of the weakened portion of the breakable link in accordance with the present invention results in an adequate change in the material failure load of the breakable link.

It should be noted that this advantage may not be obtained if the weakened portion is configured to be relatively short. In a breakable link having such a short weakened portion, the same amount of thickness change may result in a significantly greater change in the breakable link's material failure load, therefore, fine varying of the breakable link's material failure load may not be available. It should be further noted that, in order to ensure reliable rupture of the weakened portion 23, the weakened portion should not have a material failure load higher than about 70% of a material failure load of the remaining elements of the breakable link.

Since it may be required only to change the configuration of the weakened portion to product breakable links of various material failure loads, the manufacturing process is simplified which is especially true when the breakable links of the present invention are molded. The reason for this is that most of the elements need not be changed from breakable link of one material failure load to breakable link of another material failure load, and can be manufactured using the same molds. Materials suitable for the breakable link of the present invention include, but not limited to, plastic, pressed paperboard, wood, epoxy resin, polymer, co-polymers, acrylics, acrylates, nylon, polyesters, metals, alloys, and composites thereof, and laminates thereof etc. In fact, any material which is non-toxic, environmentally friendly and indegradable, easily machinable (e.g. moldable), and, preferably, salt water insoluble may be used for the breakable link of the present invention. Additionally, the materials should exhibit little or no change in strength and impact resistance due to exposure to sea water, sunlight and UV radiation, temperature variations, and excessive heat from the sun.

Advantageously, the breakable link materials are tested under the same environmental conditions as in the field where the breakable links are to be used in order to ensure that expected release effectiveness will be obtained. More particularly, the materials should not become brittle at low temperatures such as those found under the sea surface or at the sea bed level. The ideal materials should withstand single or repeated application of a load with marginal or no physical change until the material failure load is reached. The materials are preferably impact absorbent which will bend or deform under load without breaking until the load reaches a predetermined desired level. The materials should reliably break at this load level preferably without shattering. In other words, the appropriate materials should break only at or in the vicinity of the load application point leaving the rest of the breakable link substantially intact.

The elongated geometry of the weakened portion further allows a wide range of fishery ropes or cables to be used with the breakable link of the present invention. In fact, ropes or cables of virtually any size that can pass through the connecting portion 22 may be used as the buoy line 16 in the fishing line 10 of the present invention. Ropes or cables of from about 5/16 to about 7/16 inch in diameter are preferred for use with the breakable link of the present invention. For example, a breakable link configured to break at 500 lbs has been found to be best used with ropes of about 3/8 inch in diameter. The elongated weakened portion 23 ensures its proper contact with the rope or cable almost every time a load or stress is applied through the rope or cable to the breakable link. In this case, the load or stress is applied to the weakened portion which will then reliably breaks if the load or stress is high enough.

In contrast, if a breakable link is made with a relatively short weakened portion, and used with an "oversize" rope or cable, chances are, when a load is applied, the rope or cable may never contact the weakened portion or contacts it under limited conditions such as a specific angle of load application. This means, a load applied to the rope or cable may not be necessarily applied to the weakened portion. As a result, if a whale is entangled in a fishing line and the whale's struggling produces sufficient load to break the short weakened portion of the breakable link incorporated in the fishing line, the breakable link may nevertheless fail to break or breaks only after a considerable amount of time, causing harm or even death to the entangled whale.

Figures 6, 7:
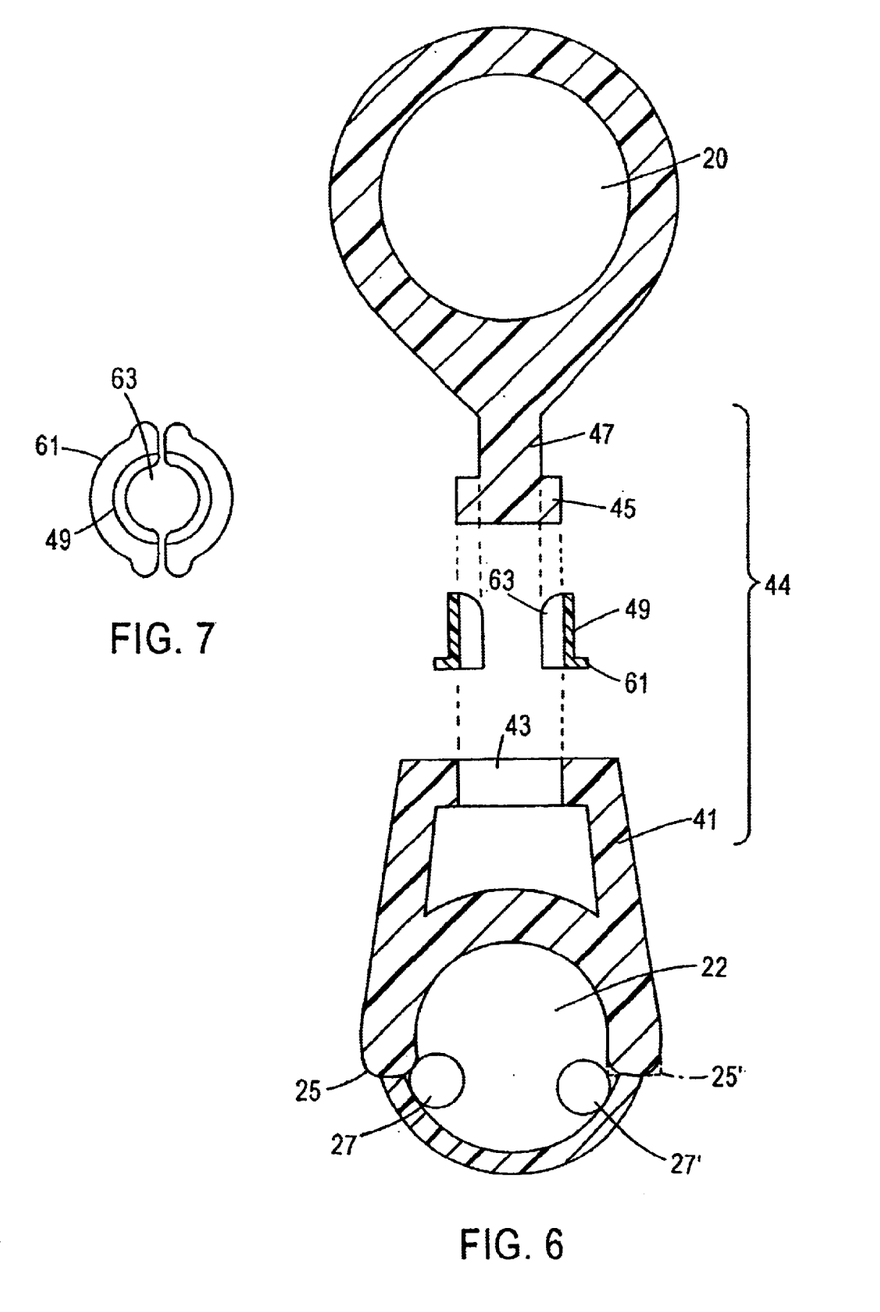
FIG. 6 is a sectional exploded view of the breakable link illustrated in FIG. 4.
FIG. 7 is a top plan view of the washer depicted in FIG. 6.

It should be noted that the shoulder at the connection between the weakened portion 23 and full-size portion 21 is preferably rounded as shown at 25 in FIGS. 2 and 6. This arrangement facilitates better accommodation of a rope or cable attached to the weakened portion 23. That is, the rope-contactable area 27 of the weakened portion 23 having the rounded shoulder 25 is larger than the rope-contactable area 27' when the shoulder 25' is not rounded, as can be seen in FIG. 6. Another advantage of the rounded shoulder, as well as the circular cross-sectional shape of the connection portions in general and the weakened portion in particular, is to prevent attaching rope or ropes from being chafed. The connection portion 22 provided with the weakened portion 23 should have no sharp edges which might chafe the rope or ropes attached thereto.

Figure 4:
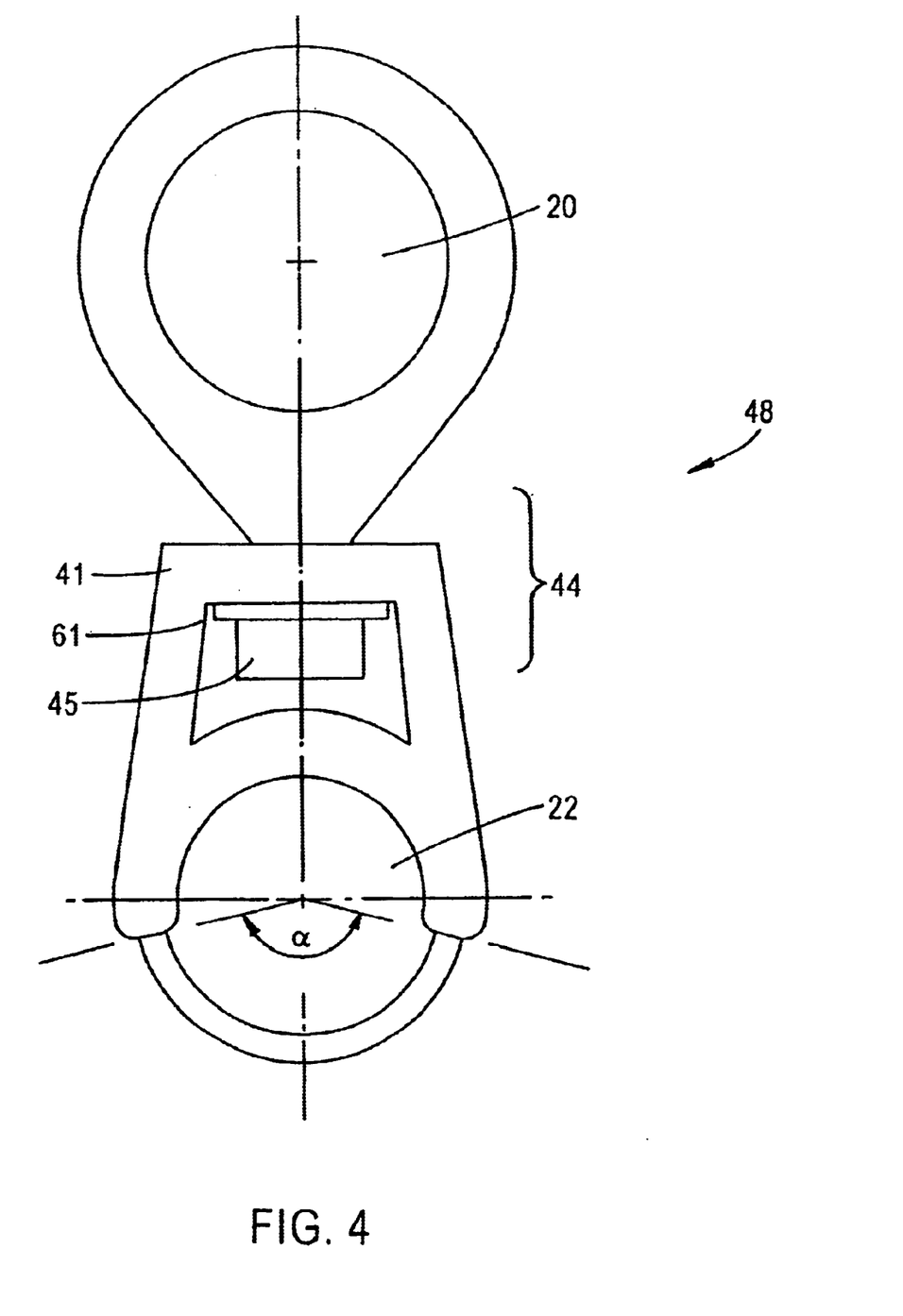
FIG. 4 is a front view of a breakable link in accordance with yet another embodiment of the present invention.
Figure 5:
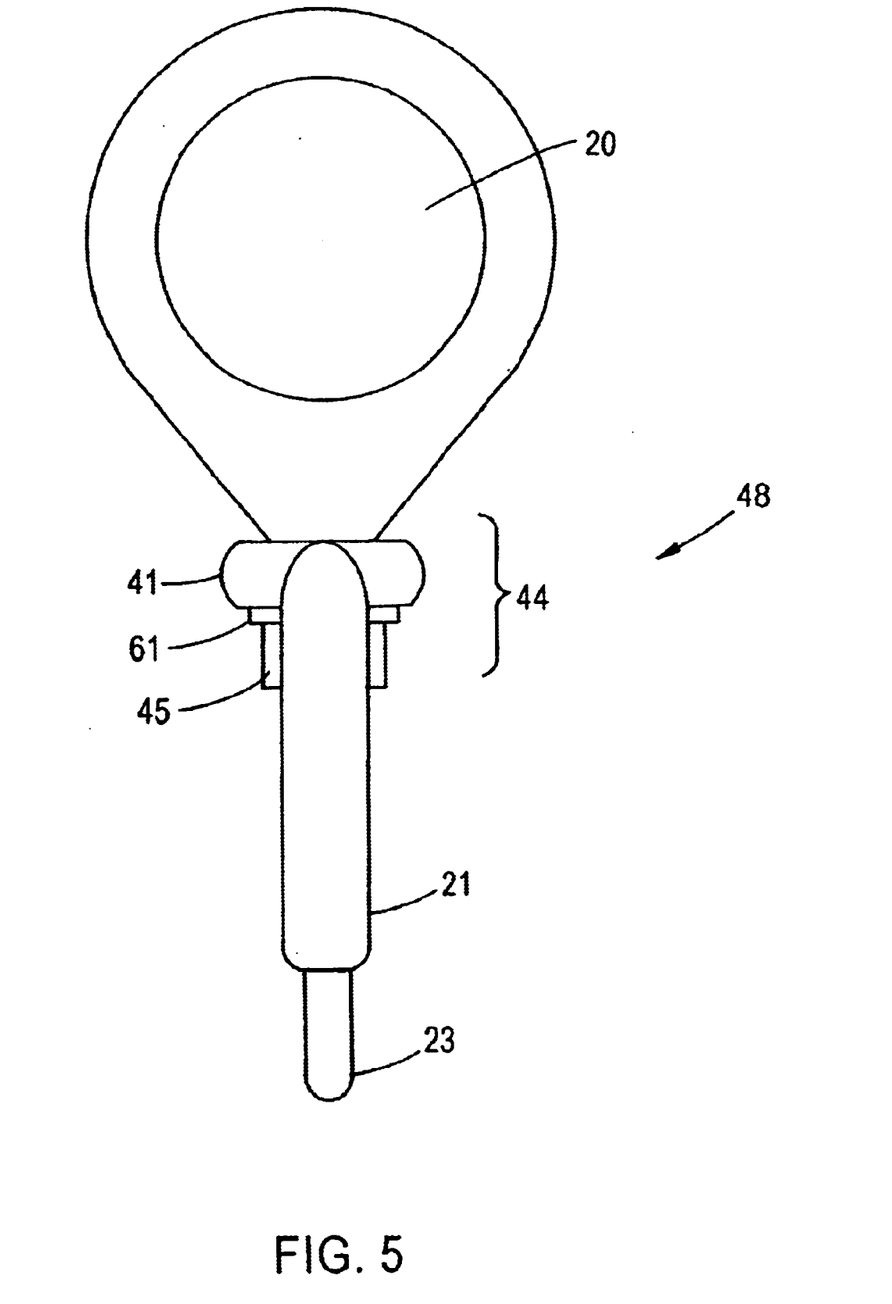
FIG. 5 is a side view of the breakable link demonstrated in FIG. 4 with the upper part thereof rotated for about 90°.

Reference is now made to FIGS. 4, 5, 6 in which another embodiment, designated at 48, of the present invention is illustrated. Unlike the embodiments depicted in FIGS. 2 and 3 where the breakable link is rigidly integrated in a single body, the embodiment of FIGS. 4–6 has connecting portions 20 and 22 formed separately and joined rotatably with each other via a join portion 44, as shown in FIGS. 4 and 5. The connecting portions 20, 22, in general, are similar to those shown in FIGS. 2–3 and need not be described in detail again.

The purpose of making the join portion 44 rotatable is to minimize problems associated with twisting of the rope or ropes attached to the breakable link 48, or the action of wind and waves. The rotatable join portion 44 is therefore can be realized by many suitable means as will be envisioned by skilled people in the art. FIGS. 4–6 illustratively show a possible arrangement for the join portion 44. The present invention is, however, not limited thereto.

As can be seen in FIG. 6, the join portion 44 comprises a frame 41, a neck portion 47, a head portion 45 and washers 49. The frame 41 is joined to the connecting portion 22 and has a through aperture 43. The neck portion 47 is joined to the connecting portion 20 while the head portion 45 is joined to the neck portion 47. The head portion 45 is sized to pass through the aperture 43 of the frame 41 so that the neck portion 47 is loosely received within the aperture 43. There are two L-shaped washers 49 which are preferably identical and together define an aperture 63 sized to receive the neck portion 47 therein. The washers 49 have respective first branches 49 interposed between an inner wall of the aperture 43 and the neck portion 47. The other branches of the washers 49 form a stop 61 preventing the head portion from being withdrawn out of the aperture 43. Thus, the connecting portions 20, 22 are attached via the rotatable join portion 44 to be rotatable with respect to each other about the longitudinal axis of the breakable link while remaining inseparable along the longitudinal axis. Certainly, the join portion 44 must exhibit a material failure load higher than that of the weakened portion 23 i.e. the elements of the join portion 44 should not be separated upon administration to the breakable link 48 of a load sufficient to break the weakened portion 23. In other words, the head portion 45 should not be withdrawn through, or break off, the aperture 43 upon application of such load.

In brief, the present invention provides a breakable link which will reliably break upon application of an appropriate load regardless of how e.g. under what angle the load is applied to the breakable link. The present invention also allows a wide variety of rope or cable to be used with the breakable link without significantly affecting the device's capability of releasing entangled cetaceans from underwater fishing lines. The present invention further facilitates calibration of the breakable link to various load requirements without scaling up or down the whole device, thereby simplifying the manufacturing process. The breakable link of the present invention is advantageously light weighted and inexpensive.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A fishing line, comprising:

a length of rope; and a breakable link comprising, along a longitudinal axis thereof, two connecting portions for connection with external devices, and a join portion joining said connecting portions together;

one of said connecting portions being formed as a loop shaped body extending continuously circumferentially for 360° and attached to said rope;

said body comprising a first portion joined to said join portion, and a second portion which is an elongated weakened portion having a material failure load smaller than that of a remainder of said breakable link, whereby said body irrecoverably breaks at said elongated weakened portion to disconnect said external devices upon administration to said elongated weakened portion via said rope of a load higher than the material failure load of said elongated weakened portion;

wherein said weakened portion is elongated for a length sufficient to allow multiple sections of said rope to be disposed side by side and to simultaneously physically contact said weakened portion.

2. The fishing line of claim 1, wherein said weakened portion is sufficiently elongated to allow four sections of said rope disposed side by side to simultaneously physically contact said weakened portion.

3. The fishing line of claim 1, wherein a material failure load of said rope is larger than the material failure load of said weakened portion.

4. A break-away connector, comprising along a longitudinal axis thereof, two connecting portions for connection with external devices, and a join portion joining said connecting portions together, one of said connecting portions being formed as a loop shaped body extending continuously circumferentially for 360°, said body comprising means for irrecoverably breaking said body, to disconnect the external devices upon administration to said body of a predetermined load at any angle, with respect to the longitudinal axis, within a range from 0 to 300°.

5. A method of establishing a fishing line, comprising the steps of:

a) providing a breakable link having two distinct first and second eyes having walls joined to each other by a join portion;

b) attaching the eyes to a surface buoy and underwater gear, respectively; and c) disconnecting the surface buoy from the underwater gear by irrecoverably breaking the wall of the first eye at a weakened portion thereof without breaking the join portion or the second eye;

wherein said providing includes providing said first eye with said weakened portion which extends circumferentially for from about 150° to about 210°.

* * * * *